Nov. 29, 1960  E. M. GLADROW  2,962,431
ACTIVATED CARBON CATALYST RADIOCHEMICAL HYDROCARBON CONVERSIONS
Filed June 28, 1956
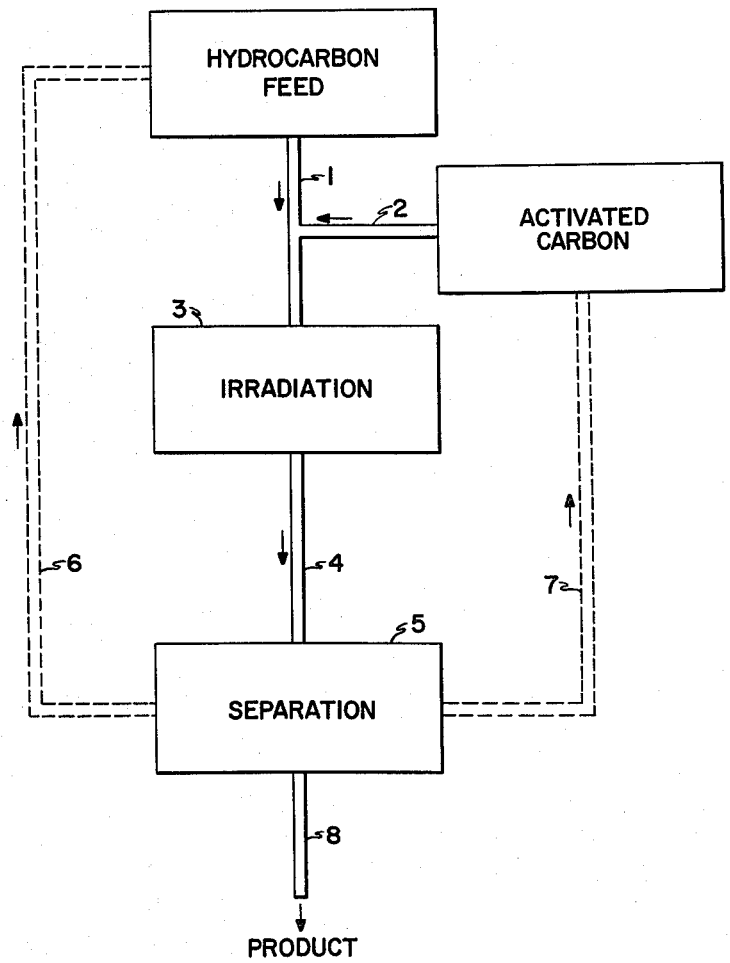
Elroy M. Gladrow  Inventor
By L. A. Strimbeck  Attorney United States Patent Office 2,962,431
Patented Nov. 29, 1960

2,962,431

ACTIVATED CARBON CATALYST RADIOCHEMICAL HYDROCARBON CONVERSIONS

Elroy Merle Gladrow, Baton Rouge, La., assignor to Esso Research and Engineering Company, a corporation of Delaware Filed June 28, 1956, Ser. No. 594,504

5 Claims. (Cl. 204—154)

This invention relates to hydrocarbon radiochemistry. It is more particularly concerned with the conversion of petroleum hydrocarbons by irradiation in the presence of an activated carbon catalyst. The radiation comprises principally gamma rays and/or neutrons.

In brief compass, this invention proposes an improved hydrocarbon radiochemical conversion process. According to this invention, hydrocarbons, particularly petroleum derived hydrocarbons, are converted by irradiation in the presence of an activated carbon catalyst. In one embodiment, the catalyst is impregnated with a neutron-capturing, alpha-emitting material which acts as an accelerator.

It is known to irradiate and convert materials by exposure to high intensity ionizing radiation such as beta and gamma rays, and neutrons. The use of radiation to bring about reactions affords a number of substantial advantages over conventional prior art practices. For example, radiation permits the obtaining of desirable equilibria in reactions that are normally not obtainable by more conventional means.

It has now been found that an activated carbon catalyst causes an appreciable and unexpected effect on the radiochemical conversion of hydrocarbons, particularly petroleum derived hydrocarbons such as naphthas and gas oils. It has surprisingly been found that an activated carbon catalyst greatly accelerates an irradiated hydrocarbon conversion process far beyond that which would normally be expected. It has also been found that the activated carbon catalyst causes appreciable isomerization among the converted hydrocarbons, particularly those hydrocarbons containing 4 to 10 carbon atoms. This is unexpected because it would normally be expected that this free radical type of catalyst would account for little isomerization.

The use of the catalyst of this invention, activated carbon, has particular advantage when applied to irradiating materials in nuclear reactors, i.e., irradiating with neutrons, because activated carbon has a very low neutron absorption cross-section.

This invention is applicable to a wide range of hydrocarbon feed stocks, including conventional petroleum oils, shale oils, tar sand oils, asphalts, synthetic oils, natural and artificial hydrocarbon gases, and the like. It has its greatest use in the conversion of petroleum derived oils, such as whole crudes, distillate and residual fractions therefrom, extracts or concentrates therefrom, or mixtures thereof. A preferred feed stock is a distillate petroleum oil boiling in a range of about 150° to 950° F., that is predominatnly paraffinic.

This invention has particular utility in increasing the value of petroleum products. For example, it is useful in isomerizing light virgin naphthas to increase octane number. It can also be used to isomerize waxes to make high viscosity index lubes. Proper choice of feed stocks and operating conditions results in products particularly suitable for use in motor oils, as chemical raw materials, or as gasoline blending components.

This invention is predicated on the use of an activated carbon catalyst of high surface area.

Activated carbon catalysts can be prepared from the calcination of hard cellulosic material such as cocoanut shells and apricot pits; from Chemico coke (a by-product in the production of white oils); from fluid coke; from coal, and similar carbonaceous materials. The raw char or coke have well developed structures of fine pores. These pores can be enlarged by any of a number of oxidizing agents which will react with the carbon, such as steam, oxygen, carbon dioxide, sulfur, and others. In general, the milder the oxidizing agent, the more active (higher surface area, larger pore volume, greater adsorption capacity) the ultimate activated carbon product. For example, oxygen reacts readily with carbon at relatively low temperatures, but its action does not produce a particularly desirable active carbon. Steam, on the other hand, which does not react rapidly with carbon below about 1200° F., is an effective activating agent at temperatures of about 1400° F. and higher. Carbon dioxide requires even higher temperatures for reaction with the carbon, but the ultimate activated carbon product is a high quality adsorbent or catalyst.

The activated carbon catalyst of this invention, in general, has the following characteristics.

The surface area of the activated carbon catalyst is above 50 m.$^2$/gr., preferably above about 200 m.$^2$/gr., and the pore volume is at least 0.20 cm.$^3$/gr. The surface area and pore volume values quoted are determined using nitrogen as employed in the well known B.E.T. method. The bulk density of the catalyst is preferably greater than 25 lbs./cu. ft. The activated carbon catalyst can be in the form of 4–100 mesh granules or finer when used in fixed bed operation, in the range of 50–325 mesh or finer in slurry type operation and principally in the range of 20–80 microns when used in fluidized solids operation. The temperature of the catalytic zone and the nature of the feed stock exert a direct influence on the type of operation employed. The attrition resistance of the activated carbon is not too critical for fixed bed operation, but for slurry type or fluidized solids operation it is preferred that the attrition rate loss be less than about 6% per hour, and in particular below about 3.5% per hour as measured according to the roller attrition test procedure. Because activated carbons are not pure carbon in that they have a residual ash content which can be as high as 4% or more, it is particularly desirable that the nature of these inorganic constituents be known so that they would not produce adverse effects when used in a nuclear pile environment. It is preferred that the total neutron absorption cross-section of the carbon catalyst and impurities be less than 75 barns.

In addition to the inherent impurities in the activated carbon which may exert catalytic effects, either because of their chemical nature or because of the nuclear properties of some of the constituent atoms, the activated carbon catalyst can be used to carry minor amounts, under about 10%, of catalytic components generally known in the art. Specific examples of such activated components are platinum, nickel, cobalt, copper, molybdates, oxides, tungstates, chromates, phosphates, sulfides and the like.

A particularly preferred form of the invention is to incorporate minor amounts of what can be termed "radiochemical accelerating or catalytic components." Of specific interest are the isotopes boron 10 and lithium 6 that upon capture of a neutron, emit highly ionizing alpha radiation. While the pure isotope can be used, the naturally occurring elements boron and lithium can be used, as they contain appreciable amounts of these isotopes. The isotopes can be used as pure elements or as compounds thereof. Specific examples of such compounds are boria ($B_2O_3$) and lithia ($Li_2O$). It is preferred to use under 10 wt. percent on catalyst of lithia, and under 2 wt. percent of boria. It is preferred to impregnate the activated charcoal with these compounds or elements, although they can be carried in the hydrocarbon reactant as oil soluble compounds such as boron triethyl, triphenyl boron, phenyl lithium and the lithium salt of high molecular weight phenols.

The activated carbon catalyst can be used as a suspension in the hydrocarbon reactant or as a fixed, fluid, or gravitating bed, all of which methods are known in the art. The catalyst, if contaminated, can be regenerated by known methods such as burning, acid treating, chemical reworking, steaming at high temperatures, and treating with $CO_2$ as described above. The solids can be regenerated in place or external of the reactor, and either continuously or periodically as the need arises.

The radiation used in the present invention can be obtained from particle accelerators, nuclear waste products, or products especially made radioactive such as cobalt 60. As examples, the spent fuel elements from an atomic pile can be used, or aluminum clad cobalt rods that have been exposed to neutron irradiation can be used. When using radioactive materials, it is preferred that the average gamma ray flux in the reaction zone be better than about $10^5$ roentgens/hr. It is also preferred that the reaction conditions be such that the hydrocarbon oil receive at least $10^6$ roentgens of gamma ray irradiation. The material can be exposed to the radiation source simply by flowing it in pipes past or through the radioactive material, or the radioactive material can be moved past the hydrocarbon to be converted.

It is much preferred, however, for reasons of economy and convenience, to use a nuclear reactor as the radiation source. Generally speaking, a much higher level of radiation is obtainable and thus, radiation times can be reduced. The neutron radiation available from a nucleonic reactor also greatly facilitates conversion of the hydrocarbon oil. In this embodiment of the invention it is preferred to have the average gamma ray flux in the reaction zone above $10^5$ roentgens/hr., and the average neutron flux above about $10^{10}$ neutrons/cm.$^2$/sec. The dosage received is preferably above about $10^7$ roentgens.

When using a nuclear reactor, the hydrocarbon oil is simply pumped through pipes disposed in or around the fissionable material. Conventional moderators such as carbon, light and heavy water, and the like, are used to obtain thermal neutrons. In some cases the hydrocarbon reactant can serve as a moderator.

This invention is applicable to conversion reactions wherein the hydrocarbon reactant is wholly or partly in the gas or condensed phase. It is most advantageously used in liquid phase reactions, and the pressure used is therefore preferably sufficient to maintain substantially liquid phase conditions. The temperature can vary widely, the preferred range being from about 200 to 900° F.

The following description of the drawing attached to and forming a part of this specification will serve to illustrate this invention.

In the drawing, a hydrocarbon material, e.g., a distillate virgin gas oil, is introduced into the process by line 1. An activated carbon catalyst, supplied by line 2, is admixed with this gas oil and the admixture is introduced into radiation zone 3. The amount of catalyst used will normally be in the range of 0.05 to 1.0 lb./lb. of feed. The flow rate of the admixture is adjusted to obtain the above dosage.

For the suspensoid system shown, i.e., one where the catalyst is carried by the hydrocarbon reactants through the reaction zone, the admixture of catalyst and irradiated product is transferred by line 4 from the radiation zone to separation zone 5. This separation zone comprises means for recovering the catalyst, such as by distillation, filtration, and absorption. The recovered catalyst can be directly recycled by line 7, if desired, or can be discarded. Before being recycled, it can first be treated as by burning, steaming, chemical reworking, and the like to remove contaminates and/or to improve its properties.

The hydrocarbon products are also separated in zone 5. Thus with the gas oil feed, distillation, extraction, absorption, or similar methods can be used. If desired, some of the hydrocarbon product can be recycled by line 6. The finished product is removed by line 8.

Separation zone 5 also includes means for removing and/or neutralizing radioactivity in the products. Such means can include storage tanks to permit decay of radioactivity, ion exchange apparatus, distillation columns, filters, and solvent extraction units.

The invention will be more fully understood by reference to the following examples:

EXAMPLE 1

The feed material was cetane. The activated carbon catalyst was Columbia G type manufactured by the Carbide and Carbon Chemical Company from coconut shells and hard nuts, and had the following inspections: surface area 1397 m.$^2$/gr. as determined by the standard B.E.T. method using nitrogen adsorption; a bulk density of 29 lbs./ft.$^3$; an attrition rate (standard roller method) of 2.6%/hr. and an ash content of 2.7%.

For comparison, an identical run using a silica-alumina catalyst was made. This silica-alumina catalyst was obtained by impregnating silica gel with an aluminum salt solution and precipitating alumina therein by addition of ammonia. The resultant hydrogel was washed free from dissolved salts with water. After oven drying and calcining at 1000° F., the catalyst had the following inspections: surface area of 417 m.$^2$/gr. (B.E.T. method); pore volume of 0.35 cm.$^3$/gr.; attrition rate (roller test) of 2.5%/hr.; and comprised 13% $Al_2O_3$ and 87% $SiO_2$.

The air cooled, natural uranium, graphite moderated research reactor of the Brookhaven National Laboratories was used to irradiate the samples. The pile was operating at a total power of about 24 megawatts at the time of these experiments. The thermal neutron flux in the reaction zone was $3.4 \times 10^{12}$/cm.$^2$/sec. The fast neutron flux (greater than one mev.) was $$0.68 \times 10^{12}/cm.^2/sec.$$

and the gamma ray flux was $1.8 \times 10^6$ roentgens/hr.

The core of the reactor was approximately a 20 ft. x 20 ft. x 20 ft. lattice of graphite with horizontal one-inch diameter aluminum clad uranium rods spaced evenly through the reactor, extending from the north to south faces of the core. The core was completely surrounded by 5 ft. of concrete shielding. The sample holes used for irradiation were horizontal 4-inch square holes extending through the 5 ft. concrete shield, and into the carbon core for a distance of 10 ft. Normal operating temperatures in the experimental hole were about 250°–400° F.

Six hundred cc. each of the catalyst and of the cetane were irradiated in a vented 3-inch diameter aluminum container mounted on a horizontal aluminum sled. Vents of aluminum tubing extended from the vapor space in the containers to a sample receiving system on the outside of the shielding. Gases and condensable liquids from the vents were metered and collected. The samples were inserted in the pile during the scheduled shutdowns, irradiated for a period of 10 days, and were then withdrawn from the pile during the following shutdown.

The following tables gives the inspections of the gaseous products obtained from irradiation.

Table I

|  | Silica-Alumina | Activated Carbon |
|---|---|---|
| Mole Percent of $H_2$ | 88.9 | 87.1 |
| $H_2$-Free HC, Mole Percent: |  |  |
| $C_1$ | 13.7 | 9.9 |
| $C_2$ | 33.8 | 24.6 |
| $C_3$ | 11.1 | 23.3 |
| $C_4$ | 20.3 | 25.4 |
| $C_5$ | 15.6 | 15.0 |
| Olefin-to-Paraffin Ratio: |  |  |
| $C_2$ | 1.2 | 0.0 |
| $C_3$ | 0.0 | 0.5 |
| $C_4$ | 0.8 | 0.6 |
| $C_5$ | 0.5 | 0.3 |
| Iso-to-n-Paraffin Ratio: |  |  |
| $C_4$ | 0.9 | 156 |
| $C_5$ | 4.4 | 20 |
| Wt. Percent of Feed to Gas | 7.4 | 5.2 |

Note the absence of normal paraffins in the $C_4$ and $C_5$ range, and the high iso-to-normal paraffin ratios. The combination of neutron irradiation and activated carbon gives extensive isomerization of the cracked fragments.

EXAMPLE 2

This example illustrates the catalytic properties of activated carbon with cetane when not in the proximity of nuclear radiation. At the temperature conditions employed in Example 1 above, namely 250°–400° F., neither activated carbon nor silica-alumina catalysts exhibit any catalytic activity with cetane feed. At higher temperatures, about 650° F. or higher, cracking does occur in the presence of these catalysts. The following table gives the inspections of the gaeous products obtained from the cracking operation with cetane at 932° F. when not in a radiation field.

Table II

|  | Silica-Alumina | Activated Carbon |
|---|---|---|
| Mole Percent $H_2$ | 5.0 | 9.9 |
| $H_2$-Free HC, Mole Percent: |  |  |
| $C_1$ | 4.6 | 13.5 |
| $C_2$ | 11.7 | 26.0 |
| $C_3$ | 32.9 | 25.4 |
| $C_4$ | 32.7 | 19.0 |
| $C_5$ | 18.1 | 16.1 |
| Olefin-to-Paraffin Ratio: |  |  |
| $C_2$ | 1.9 | 0.3 |
| $C_3$ | 3.6 | 0.6 |
| $C_4$ | 2.0 | 0.5 |
| $C_5$ | 1.9 | 0.6 |
| Iso-to-n-Paraffin Ratio: |  |  |
| $C_4$ | 2.6 | 0.0 |
| $C_5$ | 4.7 | 0.0 |
| Iso-to-n-Olefin Ratio: |  |  |
| $C_4$ | 0.7 | 0.0 |
| $C_5$ | 1.5 | 0.0 |
| Wt. Percent of Feed to Gas ($C_5-$) | 10.0 | 9.2 |

Note the complete absence of iso-olefins and iso-paraffins in the cracked products using activated carbon catalyst. Because the feed in this case is cetane (normal $C_{16}H_{34}$) the fact that no branch chain isomers appear in the cracked products show that activated carbon does not promote structural isomerization among the cracked products.

Comparison of the data in Tables I and II show the differences effected by the radiation field with activated carbon catalyst. The high yield of branched chain products with activated carbon shown in Table I must be attributed to the combined catalytic behavior of the activated carbon and the radiation.

The distribution of the cracked products from cetane using silica-alumina catalyst is not too different from normal cracking at 932° F. compared to 350°–400° F. cracking in the radiation field. It is to be noted further that both activated carbon and silica-alumina catalysts give high proportionate yields of hydrogen when cracking with radiation compared to conventional catalytic cracking.

EXAMPLE 3

Cetane was converted in the presence of a catalyst using radiation obtained from a cobalt 60 source having a rating of about 3100 curies. The previously described activated charcoal catalyst was used, and for comparison a silica-alumina catlyst was also used. About 300 cc. each of catalyst and cetane were placed in a vented container near the radiation source. The temperature was about 390° F., and the pressure was one atmosphere. The gamma ray intensity in the reaction zone was about 170,000 roentgens/hr., and the mixture was irradiated for 67½ hrs. receiving a dosage of about 13.1 megaroentgens.

Analysis of the gas recovered overhead showed that there were 6 moles of gas formed from each ion pair. There was substantially no methane in the gas product. The rate of gas evolution indicated that the activity of the charcoal catalyst was far greater than would normally be expected. The rate of gas evolution for the silica-alumina catalyst under the same conditions was far less.

The unique advantage of activated carbon catalyst during hydrocarbon radiochemical conversions appears to lie in its promoting the reaction via a different mechanism. Greensfelder[1] describes the action of activated carbon in normal cracking operation as a free radical type catalyst having quenching properties. The activated carbon acts first to remove hydrogen from the feed and thus produce free radicals which may crack. Conversely, the activated carbon can return hydrogen to the residual free radical from the cracking reaction, thereby quenching the cracking process and yielding a paraffin as product. Silica-alumina and other mixed oxide type cracking catalysts are acidic in nature and promote catalytic action by means of carbonium ion formation. With activated carbon catalyst, side reactions are suppressed and the primary action favored. It greatly accelerates the reaction and causes appreciable isomerization of the products.

Having described this invention, what is sought to be protected by Letters Patent is succinctly set forth in the following claims.

What is claimed is:

1. A hydrocarbon radiochemical conversion process which comprises irradiating a hydrocarbon boiling in the range of 150° to 950° F. with highly ionizing radiation in the presence of a catalytic amount of an activated carbon catalyst having a surface area above 50 m.²/gr., a pore volume greater than 0.20 cc./gr., a bulk density of greater than 25 lbs./ft.³ and a total neutron absorption cross-section of the carbon plus impurities of less than 75 barns, said radiation consisting of gamma rays at an average flux in the reaction zone above $10^5$ roentgens/hr., and neutrons at an average flux in the reaction zone above $10^{10}$ neutrons/cm.²/sec., and the total dosage received being above $10^7$ roentgens.

2. The process of claim 1 wherein said hydrocarbon is a petroleum oil.

3. The process of claim 1 wherein said radiation consists of radiation obtained from a nuclear reactor.

4. A hydrocarbon radiochemical conversion process which comprises irradiating a hydrocarbon boiling in the range of 150° to 950° F. with highly ionizing radiation in the presence of a catalytic amount of an activated carbon catalyst having a surface area above 50 m.²/gr., a pore volume greater than 0.20 cc./gr., a bulk density of greater than 25 lbs./ft.³ and a total neutron absorption cross-section of the carbon plus impurities of less than 75 barns, said radiation consisting of gamma rays at an average flux in the reaction zone above $10^5$ roentgens/hr., and the total dosage received being above $10^7$ roentgens.

5. A hydrocarbon radiochemical conversion process

---

[1] Greensfelder, B. S., et al.: Ind. Eng. Chem., 41, 2573 (1949).

which comprises irradiating a hydrocarbon boiling in the range of 150° to 950° F. with highly ionizing radiation in the presence of a catalytic amount of an activated carbon catalyst having a surface area above 50 m.$^2$/gr., a pore volume greater than 0.20 cc./gr., a bulk density of greater than 25 lbs./ft.$^3$ and a total neutron absorption cross-section of the carbon plus impurities of less than 75 barns, said radiation consisting of neutrons at an average flux in the reaction zone above 10$^{10}$ neutrons/cm.$^2$/sec., and the total dosage received being above 10$^7$ roentgens.

References Cited in the file of this patent

UNITED STATES PATENTS

| | | |
|---|---|---|
| 2,350,330 | Remy | June 6, 1944 |
| 2,422,884 | Burgin | June 24, 1947 |
| 2,424,152 | Connolly | July 15, 1947 |
| 2,743,223 | McClinton et. al. | Apr. 24, 1956 |

FOREIGN PATENTS

| | | |
|---|---|---|
| 665,263 | Great Britain | Jan. 23, 1952 |

OTHER REFERENCES

Davidson: "Journal of Applied Physics," vol. 19, pp. 427–433, May 1948.

Mincher: AEC Document KAPL-731; pp. 3–7, April 2, 1952, declassified February 15, 1955.

Greensfelder: "Ind. and Eng. Chem.," vol. 41, No. 11, pp. 2573–2584, November 1949.